US008077686B2

(12) United States Patent
Damle et al.

(10) Patent No.: US 8,077,686 B2
(45) Date of Patent: Dec. 13, 2011

(54) MULTIPLE PACKET DATA NETWORK SUPPORT OVER TRUSTED ACCESS

(75) Inventors: Ameya Damle, Santa Clara, CA (US); Stefano Faccin, Fremont, CA (US); Fan Zhao, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 719 days.

(21) Appl. No.: 12/171,619

(22) Filed: Jul. 11, 2008

(65) Prior Publication Data

US 2009/0022126 A1 Jan. 22, 2009

Related U.S. Application Data

(60) Provisional application No. 60/951,038, filed on Jul. 20, 2007.

(51) Int. Cl.
*H04L 29/06* (2006.01)
(52) U.S. Cl. ....................................... 370/338
(58) Field of Classification Search ................... 370/338
See application file for complete search history.

(56) References Cited

U.S. PATENT DOCUMENTS

2003/0224758 A1* 12/2003 O'Neill et al. ................ 455/411
2010/0309846 A1* 12/2010 Rune ............................ 370/328

FOREIGN PATENT DOCUMENTS

WO WO2007039016 A1 * 4/2007

OTHER PUBLICATIONS

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.
ISO/IEC 8802-11; ANSI/IEEE Std 802.11; First Edition 1999-00-00; Information Technology—Telecommunications and information exchange between systems—Local and metropolitan area networks—Specific requirement—Part 11: Wireless LAN Medium Access Control (MAC) and Physical Layer (PHY) specifications; Aug. 20, 1999; 529 pages.
Proxy Mobile IPv6; draft-ietf-netlmm-proxymip6-01.txt; S. Gundavelli, K. Leung, Cisco; V. Devarapalli, Azaire Networks; K. Chowdhury, Starent Networks; B. Patil, Nokia Siemens Networks; Jun. 18, 2007; 49 pages.
Mobility Support in IPv6; D. Johnson, Rice University; C. Perkins, Nokia Research Center; J. Arkko, Ericsson; Jun., 2004; 165 pages.
IP Mobility Support for IPv4; C. Perkins, Ed., Nokia Research Center; Aug. 2002; 99 pages.

* cited by examiner

*Primary Examiner* — Melvin Marcelo

(57) ABSTRACT

A media access gateway comprises a wireless network interface, an authorization module, a filter information module, and a proxy mobility agent module. The wireless network interface selectively establishes a wireless link with a first interface of a wireless terminal that has a plurality of wireless interfaces. The authorization module determines a home agent corresponding to the wireless terminal. The filter information module receives filter information from one of the wireless terminal and a server and generates output filter information. The proxy mobility agent module transmits a binding update to the home agent. The binding update includes the output filter information.

19 Claims, 10 Drawing Sheets

| Binding Cache Entry ⌐350 | Packet Destination ⌐352 | Forward To ⌐354 | Access Type ⌐356 | Filters ⌐358 | Access Priority ⌐360 |
|---|---|---|---|---|---|
| 1 | HoA1 | CoA1 | 1 | Filter Set 1 | 1 |
| | | | | Filter Set 3 | 2-1-3 |
| | | CoA2 | 2 | Filter Set 2 | 2 |
| | | | | Filter Set 3 | 2-1-3 |

MULTIPLE PACKET DATA NETWORK SUPPORT OVER TRUSTED ACCESS

CROSS-REFERENCE TO RELATED APPLICATIONS

This application claims the benefit of U.S. Provisional Application No. 60/951,038, filed on Jul. 20, 2007. The disclosure of the above application is incorporated herein by reference in its entirety.

FIELD

The present disclosure relates to connecting to multiple packet data networks and more particularly to providing data over multiple packet data networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example only, the wireless terminal 106 may be a mobile phone, and the home network 102 may be the cellular network of a mobile phone operator.

The wireless terminal 106 is configured to work with the home network 102, and may be unable to connect to the networks of other carriers. In various implementations, the wireless terminal 106 may be able to view content from the distributed communications system 104 via the home network 102. The home network 102 may interconnect with the networks of other service providers and/or core networks.

Referring now to FIG. 2, a functional block diagram of a wireless communications system offering mobility is presented. The home network 102 is connected to one or more visited networks 110. For example only, FIG. 2 depicts three visited networks 110-1, 110-2, and 110-3. In various implementations, the visited networks 110 may be the networks of other service providers, including service providers in other countries.

A mobile wireless terminal 120 includes mobility features that allow it to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110. Because the mobile wireless terminal 120 itself includes mobility features, the mobile wireless terminal 120 may be described as supporting client mobile internet protocol (CMIP).

For example, mobile internet protocol (IP) for IP version 6 (IPv6) is described in request for comment (RFC) 3775, titled "Mobility Support in IPv6," the disclosure of which is hereby incorporated by reference in its entirety. Mobile IP for IP version 4 (IPv4) is described in RFC 3344, entitled "IP Mobility Support for IPv4," the disclosure of which is hereby incorporated by reference in its entirety.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, which do not include mobility functionality. This may be referred to as proxy mobile IP (PMIP) or network mobile IP. Proxy mobility in IPv6 is described in an Internet Engineering Task Force (IETF) draft titled "Proxy Mobile IPv6" (published Jun. 18, 2007 and available as "draft-ietf-netlmm-proxymip6-01.txt"), the disclosure of which is hereby incorporated by reference in its entirety.

When the wireless terminal 106 attempts to establish a link with the visited network 160-1, the visited network 160-1 determines the network to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 can therefore be oblivious to the fact that it is connected to the visited network 160-1 instead of to the home network 150.

Referring now to FIG. 4A, a functional block diagram and timeline of an implementation of client mobility are presented. The home network 102 includes a home agent (HA) 180. The HA 180 establishes the logical location of the mobile wireless terminal 120. Packets ultimately destined for the mobile wireless terminal 120 are sent to the HA 180, while packets from the mobile wireless terminal 120 will appear to originate from the location of the HA 180.

The mobile wireless terminal 120 may establish a connection to an access router (AR) 182 within the visited network 110-1. In various implementations, additional ARs (not shown) may be present. The AR 182 may communicate with other networks, including the home network 102.

When the mobile wireless terminal 120 connects to the visited network 110-1, the mobile wireless terminal 120 performs authentication and authorization with the access router 182. This may include communicating with an authentication, authorization, and accounting (AAA) server. The AAA server may retrieve information based on an identifier of the mobile wireless terminal 120, such as a network address identifier, that uniquely identifies the mobile wireless terminal 120. The AAA server may indicate to the AR 182 whether the mobile wireless terminal 120 should be allowed access and what services should be provided.

The mobile wireless terminal 120 receives a local address from the AR 182. Using this address, the mobile wireless terminal 120 can communicate with various network elements, including the HA 180. The mobile wireless terminal 120 transmits a binding update message to the HA 180. The HA 180 allocates a global home address HoA to the mobile wireless terminal 120. The HA 180 may create a binding cache entry that records information about the mobile wireless terminal 120, such as the current address of the mobile wireless terminal 120 and the allocated address HoA.

The HA 180 transmits a binding acknowledgement message to the mobile wireless terminal 120. The binding acknowledgement message includes HoA so that the mobile wireless terminal 120 is aware of its global home address. Packets sent from other network devices, such as other wireless terminals, are sent to that home address. The HA 180 receives those packets and forwards them to the mobile wireless terminal 120. Similarly, packets from the mobile wireless terminal 120 are first sent to the HA 180. The HA 180 then forwards the packets with a source address of HoA. To allow for packets to be exchanged between the mobile wireless terminal 120 and the HA 180, a tunnel is established between the mobile wireless terminal 120 and the HA 180.

Referring now to FIG. 4B, a functional block diagram and timeline of an implementation of proxy mobility are presented. The wireless terminal 106 may establish a connection to a media access gateway (MAG) 190 in the visited network 160-1. In various implementations, additional MAGs (not shown) may be present in the visited network 160-1. The MAG 190 may communicate with other networks, including the home network 150.

When the wireless terminal 106 connects to the MAG 190, the MAG 190 may authenticate the wireless terminal 106 and determine what services the wireless terminal 106 is authorized to access. The wireless terminal 106 then requests an address from the MAG 190. The MAG 190 determines a local mobility anchor (LMA) to which the wireless terminal 106 belongs. For example only, the MAG 190 may consult a home subscriber server (HSS) to determine the appropriate LMA.

The MAG 190 then sends a proxy binding update identifying the wireless terminal 106 to the identified LMA, which in this case is LMA 192, located in the home network 150. The LMA 192 allocates a home address HoA to the wireless terminal 106. The LMA 192 may also create a binding cache entry to record information about the wireless terminal 106. The LMA 192 sends a proxy binding acknowledgement including HoA to the MAG 190.

The MAG 190 and LMA 192 establish a tunnel for transfer of packets to and from the wireless terminal 106. The MAG 190 then assigns HoA to the wireless terminal 106. When the wireless terminal 106 transmits a packet, the MAG 190 sends that packet through the tunnel to the LMA 192. The LMA 192 then forwards the packet with a source address of HoA. When a packet arrives at the LMA 192 with a destination address of HoA, the LMA 192 sends the packet to the MAG 190 through the tunnel. The MAG 190 then forwards the packets to the wireless terminal 106.

Using this architecture, the wireless terminal 106 can be unaware of the mobility services provided by the MAG 190. The wireless terminal 106 has been assigned a home address and does not need to be aware that it is actually connected to the visited network 160-1 instead of the home network 150.

SUMMARY

A media access gateway comprises a wireless network interface, an authorization module, a filter information module, and a proxy mobility agent module. The wireless network interface selectively establishes a wireless link with a first interface of a wireless terminal that has a plurality of wireless interfaces. The authorization module determines a home agent corresponding to the wireless terminal. The filter information module receives filter information from one of the wireless terminal and a server and generates output filter information. The proxy mobility agent module transmits a binding update to the home agent. The binding update includes the output filter information.

The wireless link is a first type and the binding update includes an identifier of the first type. The first type is one of cellular, wireless local area network, wireless metropolitan area network, and wireless personal area network. The wireless link is a first type. The filter information module receives the filter information from the server and generates the output filter information by removing filter information that is not associated with the first type. The wireless link is a first type. The filter information module transmits an identifier of the first type to the server, receives the filter information from the server, and outputs the filter information as the output filter information.

The proxy mobility agent module receives an additional interface flag from the wireless terminal. The binding update includes the additional interface flag. The home agent maintains previous state information for the wireless terminal when the binding update includes the additional interface flag. The authorization module determines authorization of the wireless terminal by querying the server and determines the home agent by querying the server.

A communications system comprises the media access gateway and the home agent. The home agent comprises a home agent module that receives the binding update; a binding cache module that stores an entry corresponding to the wireless terminal, where the entry includes the output filter information; and a network processor that selectively forwards packets based on the output filter information. The home agent module selectively receives an additional interface flag. The binding cache module selectively replaces a previous entry in the binding cache when the additional interface flag is in a first state. The binding cache module supplements a previous entry in the binding cache when the additional interface flag is in a second state.

The home agent module allocates a home internet protocol (IP) address to the wireless terminal when the binding cache module first creates the entry for the wireless terminal. The network processor evaluates the output filter information for packets having a destination address of the home IP address. The network processor selectively forwards packets that match the output filter information to the media access gateway.

The communications system further comprises the wireless terminal, which comprises a control module that controls the plurality of wireless interfaces. The plurality of wireless interfaces selectively establish wireless links with a plurality of media access gateways including the media access gateway. The control module stores filter information for each of the plurality of wireless interfaces. When one of the plurality of wireless interfaces establishes a wireless link with one of the plurality of media access gateways, the control module transmits filter information for the one of the plurality of wireless interfaces to the one of the plurality of media access gateways.

The filter information is included in a message that requests a Layer 3 address from the one of the plurality of media access gateways. The control module transmits an additional connection flag having a first state when one of the plurality of wireless interfaces replaces one wireless link with another wireless link. The control module transmits the additional connection flag having a second state when the one of the plurality of wireless interfaces establishes a new wireless link.

A media access gateway comprises wireless network interfacing means for selectively establishing a wireless link with a first interface of a wireless terminal that has a plurality of wireless interfaces; authorization means for determining a home agent corresponding to the wireless terminal; filter information means for receiving filter information from one of the wireless terminal and a server and for generating output filter information; and proxy mobility agent means for transmitting a binding update to the home agent. The binding update includes the output filter information.

The wireless link is a first type and the binding update includes an identifier of the first type. The first type is one of cellular, wireless local area network, wireless metropolitan area network, and wireless personal area network. The wireless link is a first type. The filter information means receives the filter information from the server and generates the output filter information by removing filter information that is not associated with the first type.

The wireless link is a first type. The filter information means transmits an identifier of the first type to the server, receives the filter information from the server, and outputs the filter information as the output filter information. The proxy mobility agent means receives an additional interface flag from the wireless terminal. The binding update includes the additional interface flag. The home agent maintains previous state information for the wireless terminal when the binding update includes the additional interface flag.

The authorization means determines authorization of the wireless terminal by querying the server and determines the home agent by querying the server. A communications system comprises the media access gateway of claim 1 and the home agent. The home agent comprises home agent means for receiving the binding update; binding cache means for storing an entry corresponding to the wireless terminal, where the entry includes the output filter information; and network processing means for selectively forwarding packets based on the output filter information.

The home agent means selectively receives an additional interface flag. The binding cache means selectively replaces a previous entry in the binding cache when the additional interface flag is in a first state. The binding cache means supplements a previous entry in the binding cache when the additional interface flag is in a second state. The home agent means allocates a home internet protocol (IP) address to the wireless terminal when the binding cache means first creates the entry for the wireless terminal. The network processing means evaluates the output filter information for packets having a destination address of the home IP address. The network processing means selectively forwards packets that match the output filter information to the media access gateway.

The communications system further comprises the wireless terminal, which comprises control means for controlling the plurality of wireless interfaces. The plurality of wireless interfaces selectively establish wireless links with a plurality of media access gateways including the media access gateway. The control means stores filter information for each of the plurality of wireless interfaces. When one of the plurality of wireless interfaces establishes a wireless link with one of the plurality of media access gateways, the control means transmits filter information for the one of the plurality of wireless interfaces to the one of the plurality of media access gateways.

The filter information is included in a message that requests a Layer 3 address from the one of the plurality of media access gateways. The control means transmits an additional connection flag having a first state when one of the plurality of wireless interfaces replaces one wireless link with another wireless link. The control means transmits the additional connection flag having a second state when the one of the plurality of wireless interfaces establishes a new wireless link.

A method comprises selectively establishing a wireless link with a first interface of a wireless terminal that has a plurality of wireless interfaces; determining a home agent corresponding to the wireless terminal; receiving filter information from one of the wireless terminal and a server; generating output filter information based on the filter information; and transmitting a binding update to the home agent. The binding update includes the output filter information.

The wireless link is a first type and the binding update includes an identifier of the first type. The first type is one of cellular, wireless local area network, wireless metropolitan area network, and wireless personal area network. The wireless link is a first type, the filter information is received from the server, and the output filter information is generated by removing filter information that is not associated with the first type.

The wireless link is a first type and the filter information is received from the server, and further comprises outputting the filter information as the output filter information and transmitting an identifier of the first type to the server. The method further comprises receiving an additional interface flag from the wireless terminal and including the additional interface flag in the binding update. The home agent maintains previous state information for the wireless terminal when the binding update includes the additional interface flag.

The method further comprises determining authorization of the wireless terminal by querying the server and determining the home agent by querying the server. The method further comprises receiving the binding update; storing an entry corresponding to the wireless terminal in a binding cache. The entry includes the output filter information; and selectively forwarding packets based on the output filter information. The binding update selectively includes an additional interface flag, and further comprises selectively replacing a previous entry in the binding cache when the additional interface flag is in a first state, and supplementing a previous entry in the binding cache when the additional interface flag is in a second state.

The method further comprises allocating a home internet protocol (IP) address to the wireless terminal when the entry for the wireless terminal is stored. The method further comprises evaluating the output filter information for packets having a destination address of the home IP address. The method further comprises selectively forwarding packets that match the output filter information.

The method further comprises selectively establishing wireless links between the plurality of wireless interfaces of the wireless terminal and a plurality of media access gateways. The method further comprises storing filter information for each of the plurality of wireless interfaces; and transmitting filter information for one of the plurality of wireless interfaces to one of the plurality of media access gateways when the one of the plurality of interfaces establishes a wireless link with the one of the plurality of media access gateways.

The filter information is transmitted in a message that requests a Layer 3 address from the one of the plurality of media access gateways. The method further comprises transmitting an additional connection flag having a first state when one of the plurality of wireless interfaces establishes a wireless link that replaces another wireless link; and transmitting the additional connection flag having a second state when the one of the plurality of wireless interfaces establishes a new wireless link.

A computer program stored on a computer-readable medium for use by a processor comprises selectively establishing a wireless link with a first interface of a wireless terminal that has a plurality of wireless interfaces; determining a home agent corresponding to the wireless terminal; receiving filter information from one of the wireless terminal and a server; generating output filter information based on the filter information; and transmitting a binding update to the home agent. The binding update includes the output filter information.

The wireless link is a first type and the binding update includes an identifier of the first type. The first type is one of cellular, wireless local area network, wireless metropolitan area network, and wireless personal area network. The wireless link is a first type, the filter information is received from the server, and the output filter information is generated by removing filter information that is not associated with the first type.

The wireless link is a first type and the filter information is received from the server, and further comprises outputting the filter information as the output filter information and transmitting an identifier of the first type to the server. The computer program further comprises receiving an additional interface flag from the wireless terminal and including the additional interface flag in the binding update. The home agent maintains previous state information for the wireless terminal when the binding update includes the additional interface flag.

The computer program further comprises determining authorization of the wireless terminal by querying the server and determining the home agent by querying the server. The computer program further comprises receiving the binding update; storing an entry corresponding to the wireless terminal in a binding cache. The entry includes the output filter information; and selectively forwarding packets based on the output filter information. The binding update selectively includes an additional interface flag, and further comprises selectively replacing a previous entry in the binding cache when the additional interface flag is in a first state, and supplementing a previous entry in the binding cache when the additional interface flag is in a second state.

The computer program further comprises allocating a home internet protocol (IP) address to the wireless terminal when the entry for the wireless terminal is stored. The computer program further comprises evaluating the output filter information for packets having a destination address of the home IP address. The computer program further comprises selectively forwarding packets that match the output filter information.

The computer program further comprises selectively establishing wireless links between the plurality of wireless interfaces of the wireless terminal and a plurality of media access gateways. The computer program further comprises storing filter information for each of the plurality of wireless interfaces; and transmitting filter information for one of the plurality of wireless interfaces to one of the plurality of media access gateways when the one of the plurality of interfaces establishes a wireless link with the one of the plurality of media access gateways.

The filter information is transmitted in a message that requests a Layer 3 address from the one of the plurality of media access gateways. The computer program further comprises transmitting an additional connection flag having a first state when one of the plurality of wireless interfaces establishes a wireless link that replaces another wireless link; and transmitting the additional connection flag having a second state when the one of the plurality of wireless interfaces establishes a new wireless link.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings is wherein.

DETAILED DESCRIPTION

Figure 1:
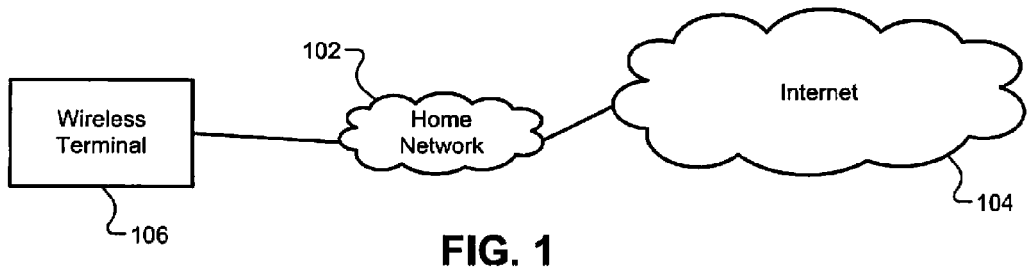
FIG. 1 is a functional block diagram of a wireless communications system according to the prior art.
Figure 2:
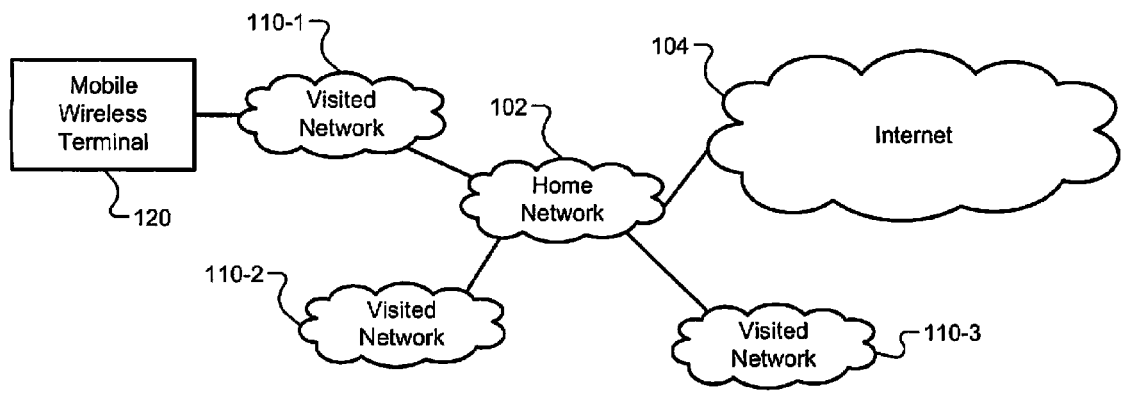
FIG. 2 is a functional block diagram of a wireless communications system offering mobility according to the prior art.
Figure 3:
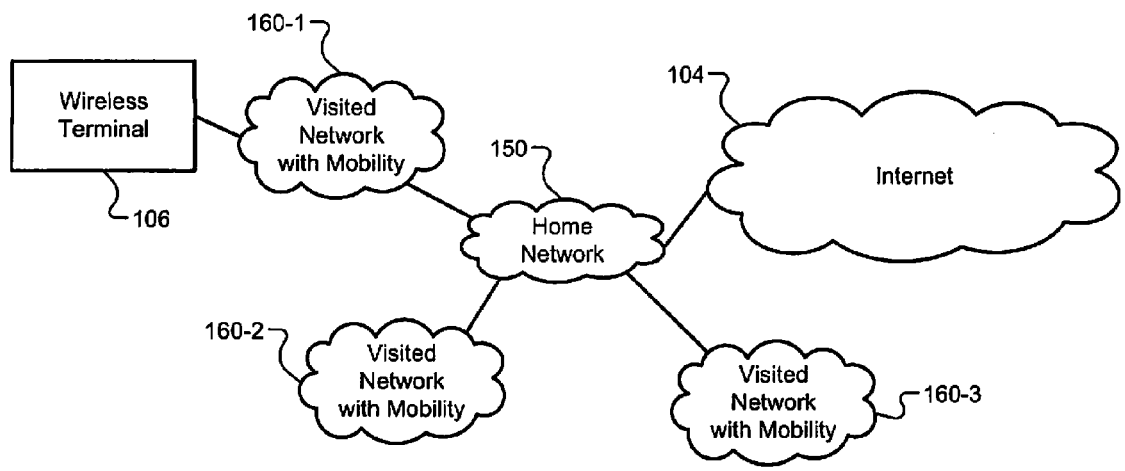
FIG. 3 is a functional block diagram of a wireless communications system according to the prior art that provides proxy mobility to a wireless terminal.
Figure 4A:
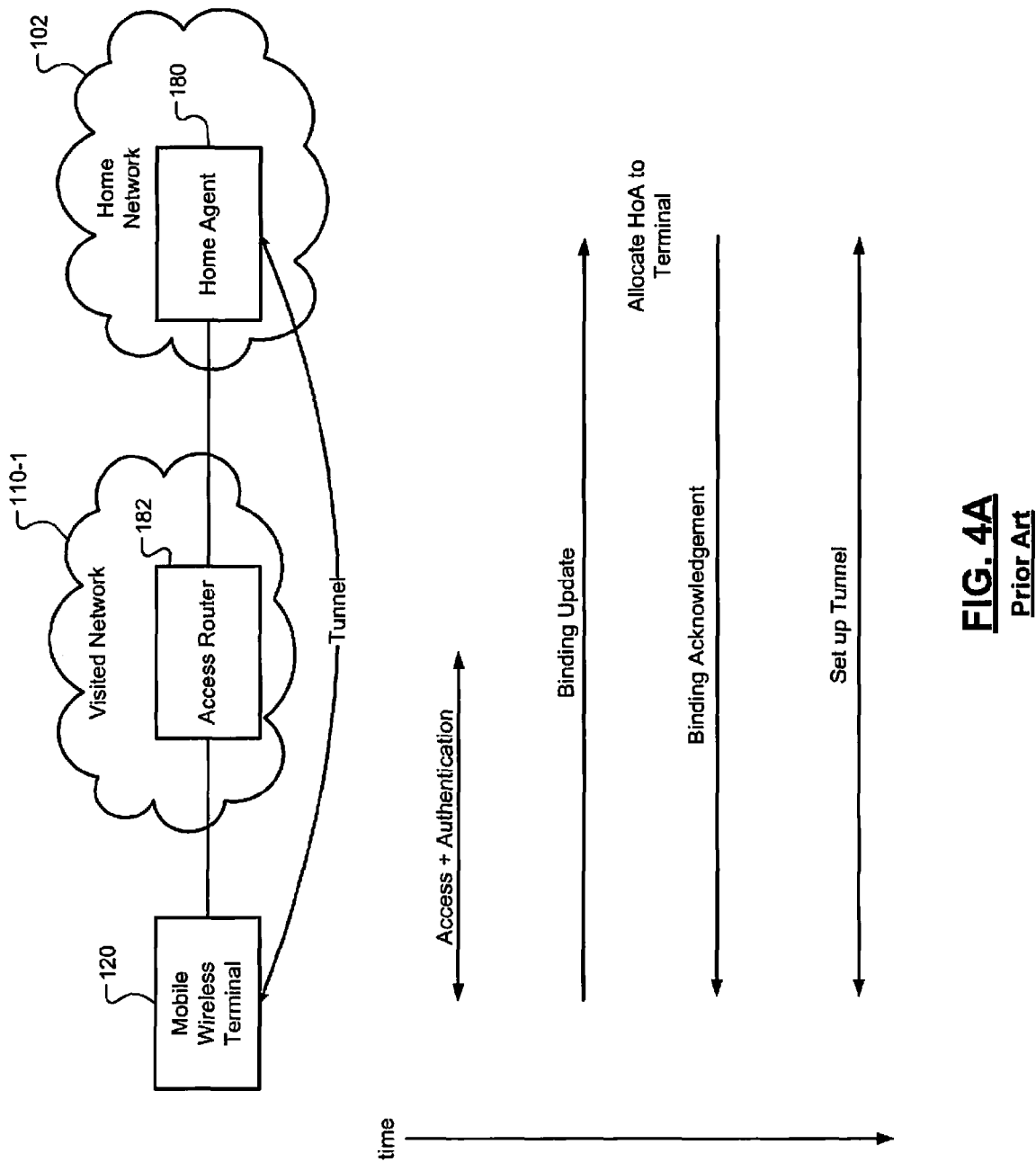
FIG. 4A is a functional block diagram and timeline of an implementation of client mobility according to the prior art.
Figure 4B:
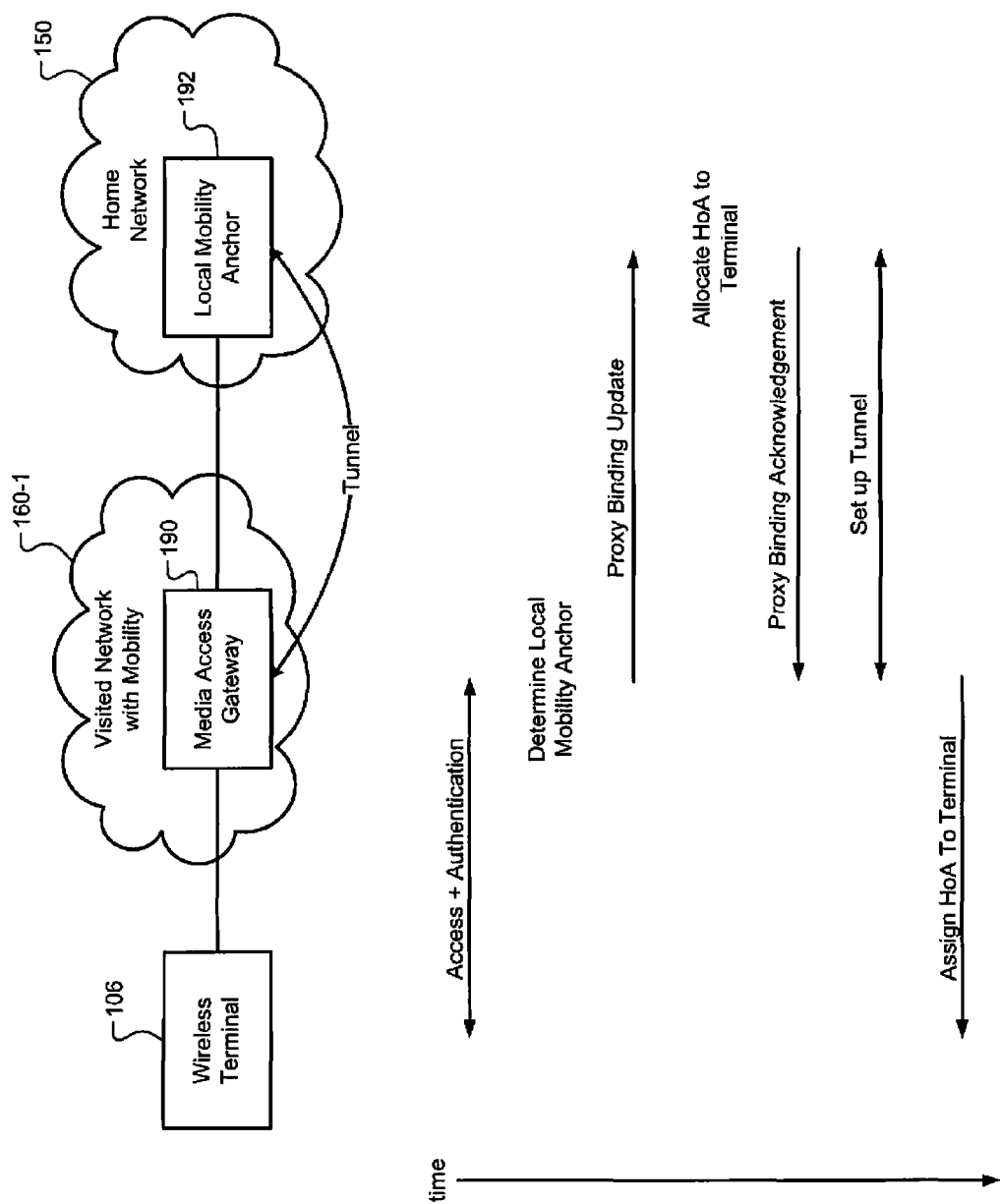
FIG. 4B is a functional block diagram and timeline of an implementation of proxy mobility according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When a wireless terminal includes multiple wireless interfaces, the multiple interfaces may all establish wireless links. For example, a cellular interface of the wireless terminal may be associated with a base station while a wireless local area network (WLAN) interface of the wireless terminal may be associated with an access point.

As part of proxy mobility, a home agent assigns home addresses to interfaces of the wireless terminal that connect to access networks. In various implementations, more than one interface may receive the same home address. The wireless terminal can determine which interface should be used to send the packets based upon application or network preferences. However, when the home agent receives a packet destined for the shared home address, the home agent does not know which interface of the wireless terminal should receive the packet.

Filtering rules can be stored in the home agent to determine what traffic will be transmitted to which wireless interface. The wireless terminal may provide filter information specific to each of its interfaces. Alternatively, the wireless terminal may be implemented without awareness of filter information, such as when the wireless terminal does not support CMIP and relies upon PMIP for mobility. In this case, the home agent may receive filter information from a server that stores filter information corresponding to various wireless terminals. This server may be implemented as part of the home agent and/or may be an authentication/authorization/accounting (AAA) server.

The visited network to which each interface of the wireless terminal connects can specify to the home agent the type of interface that has been connected. For example, one visited network may report that a WLAN interface has been connected. The home agent may then retrieve and/or generate filtering rules corresponding to a WLAN interface.

Alternatively, the visited network may consult a distributed or centralized repository, such as an AAA server. The AAA server may store rules for all anticipated wireless terminal interfaces. The visited network can then select the appropriate rules based on which interface is connected to the visited network. These selected rules may be modified and are then sent to the home agent. When the home agent receives a packet destined for the wireless terminal, the home agent determines the interface to send the packet to by identifying which set of filtering rules the packet matches.

Figure 5:
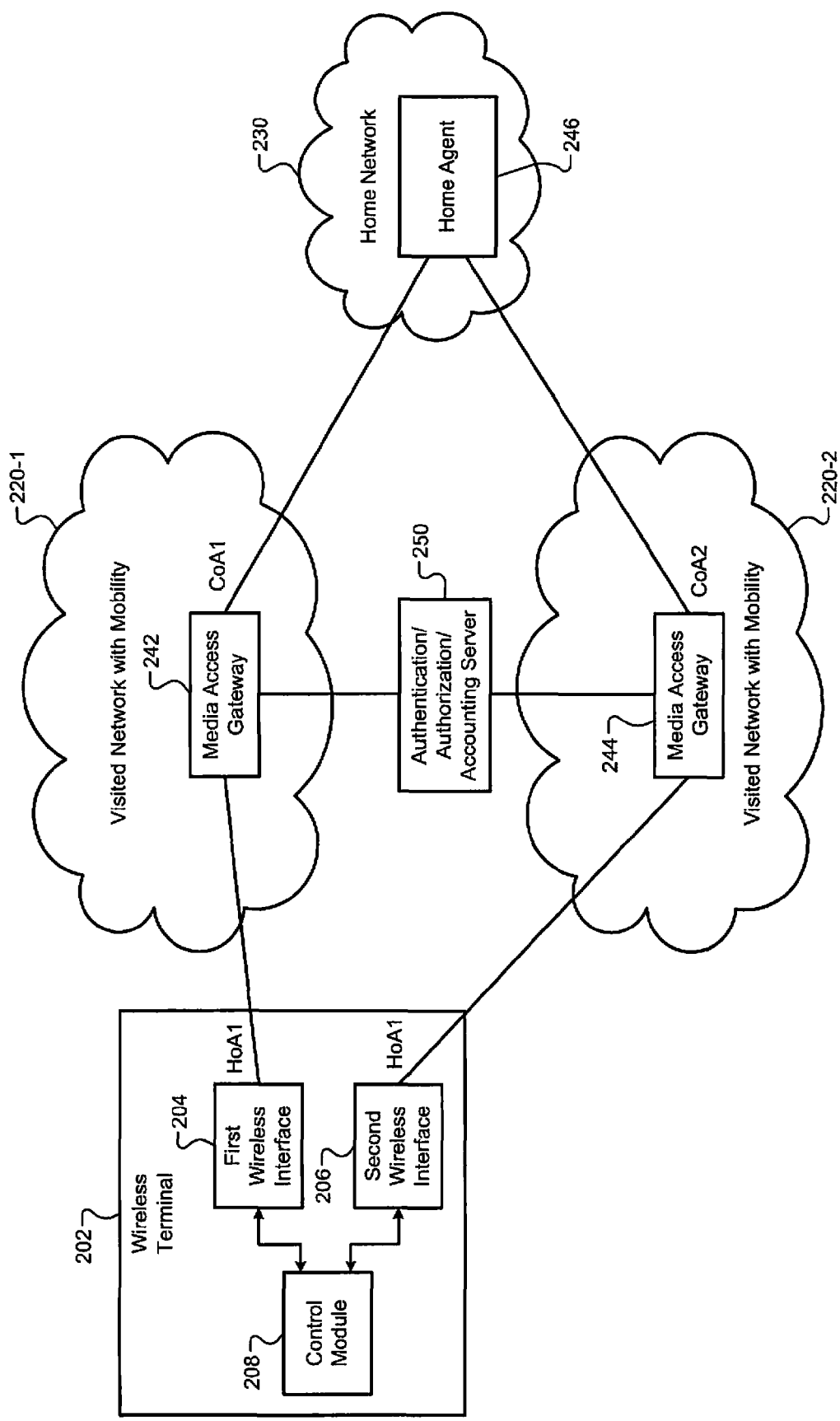
FIG. 5 is a functional block diagram of an exemplary wireless communications system according to the principles of the present disclosure.
Figures 6, 7:
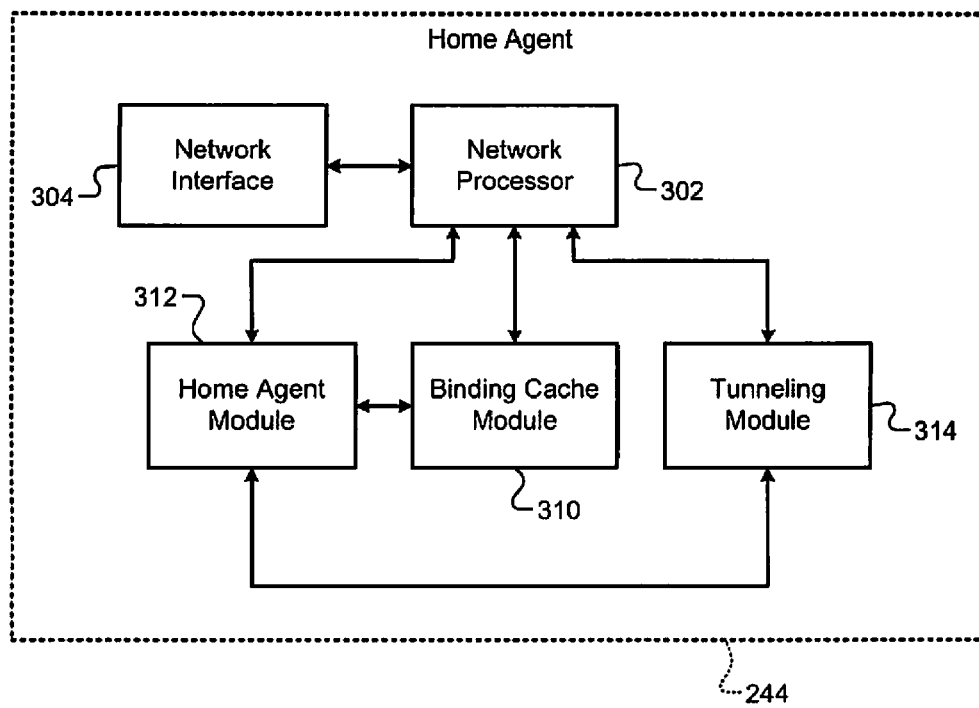
FIG. 6 is a functional block diagram of an exemplary implementation of the home agent according to the principles of the present disclosure.
FIG. 7 is an exemplary binding cache table according to the principles of the present disclosure.
Figure 8:
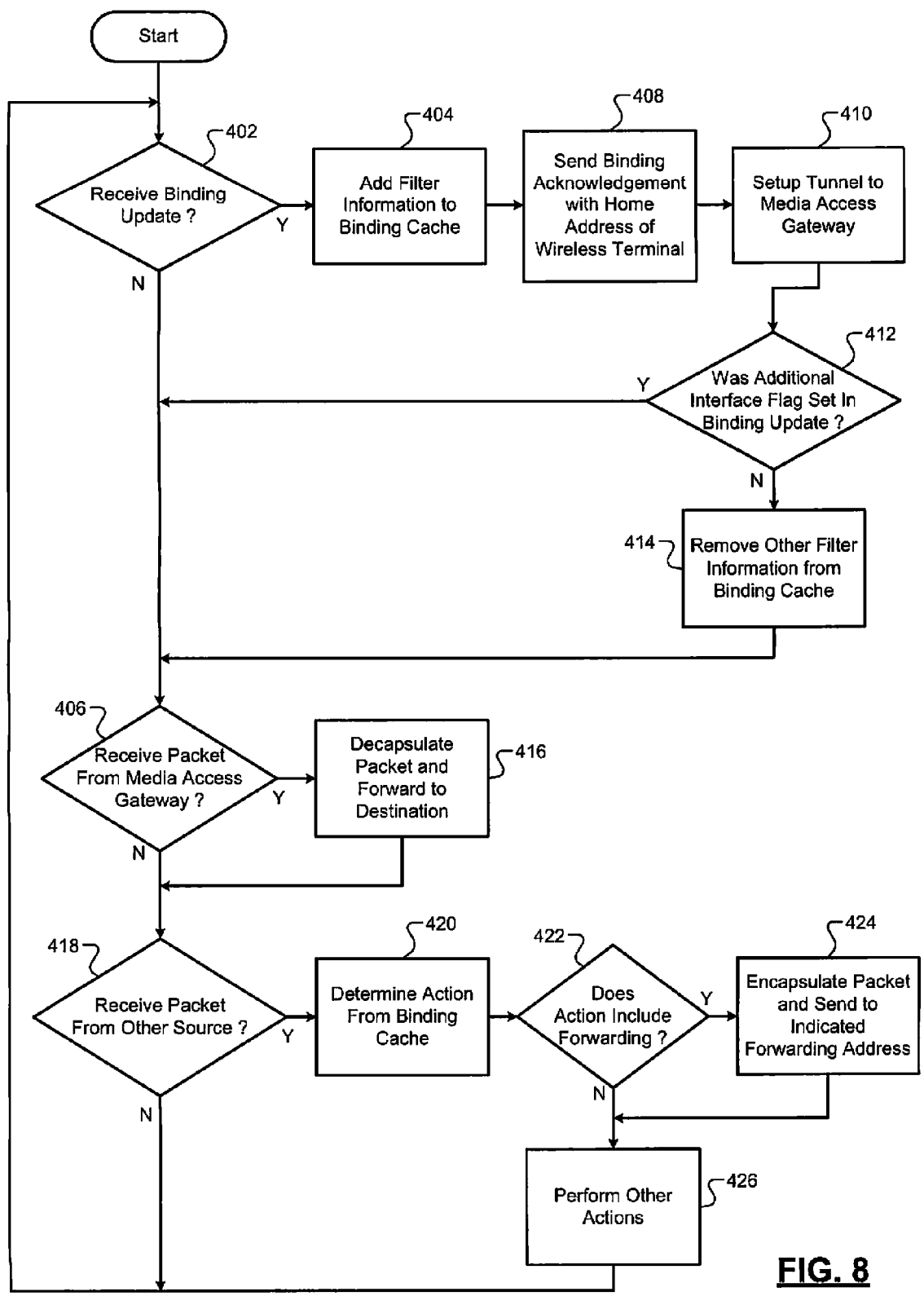
FIG. 8 is a flowchart depicting exemplary operation of the home agent of FIG. 6 according to the principles of the present disclosure.
Figure 9:
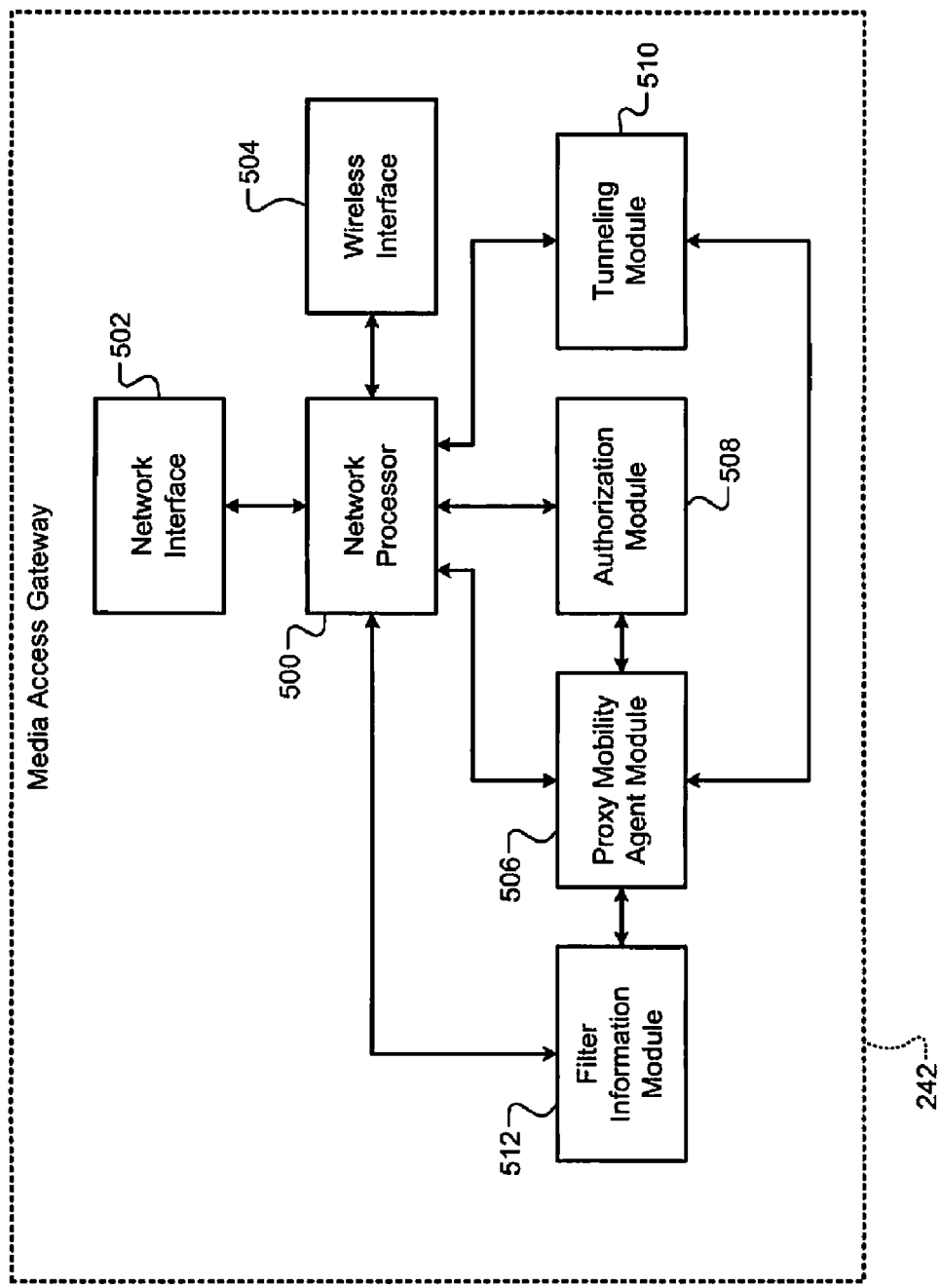
FIG. 9 is a functional block diagram of an exemplary implementation of the media access gateway according to the principles of the present disclosure.
Figure 10A:
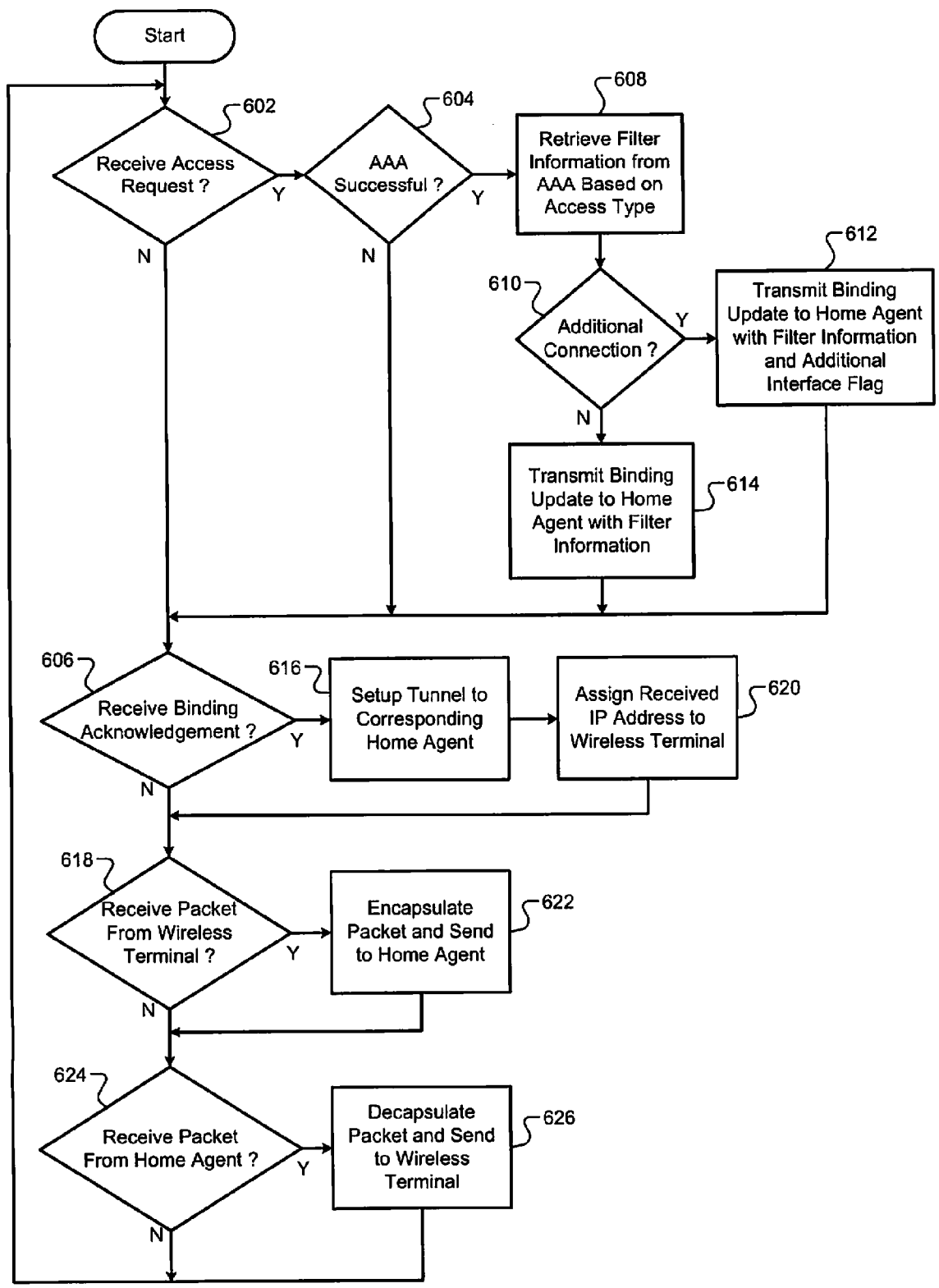
FIGS. 10A-10B are flowcharts depicting exemplary operation of the media access gateway of FIG. 9 according to the principles of the present disclosure.
Figure 10B:
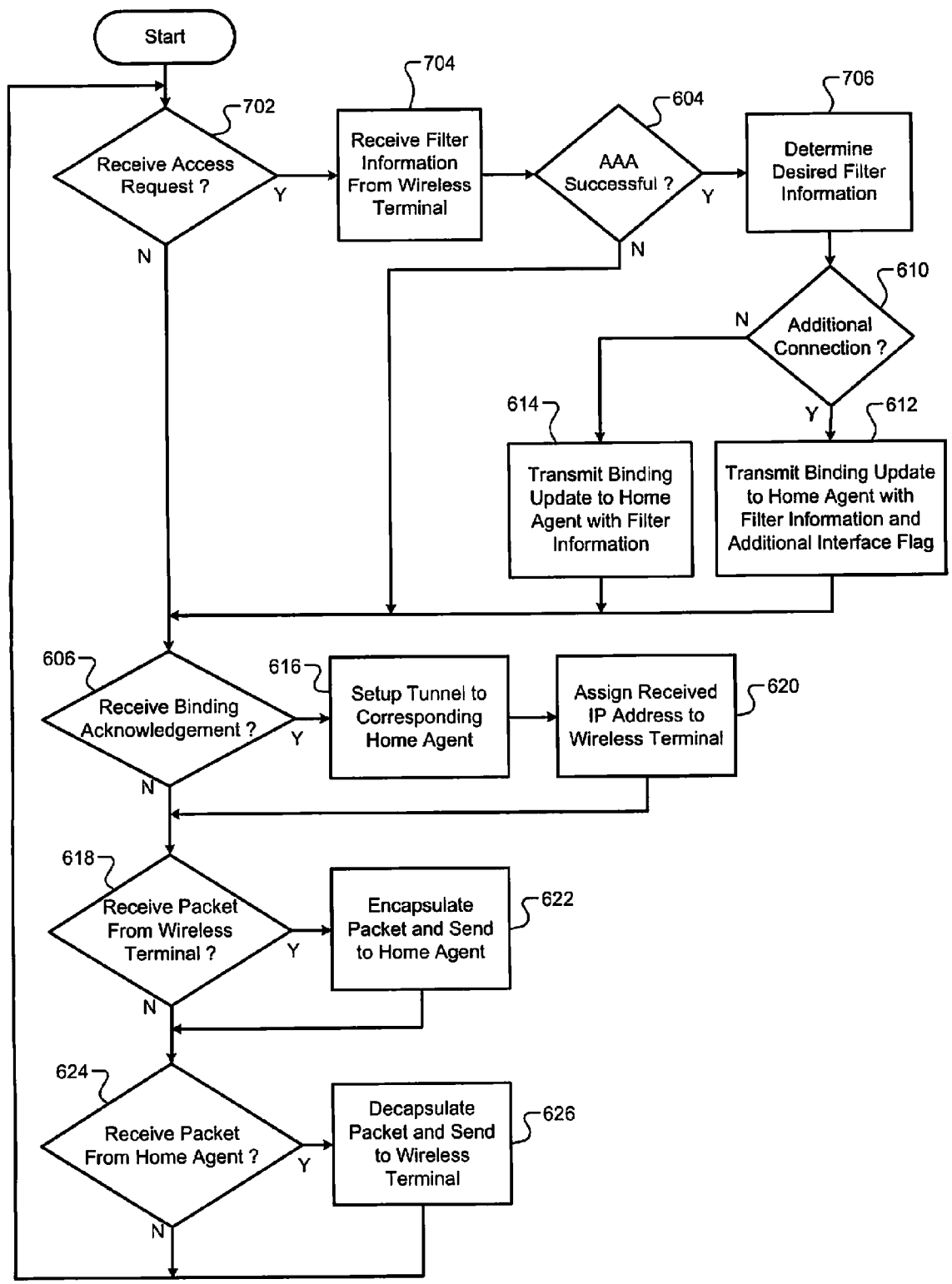
Figure 11:
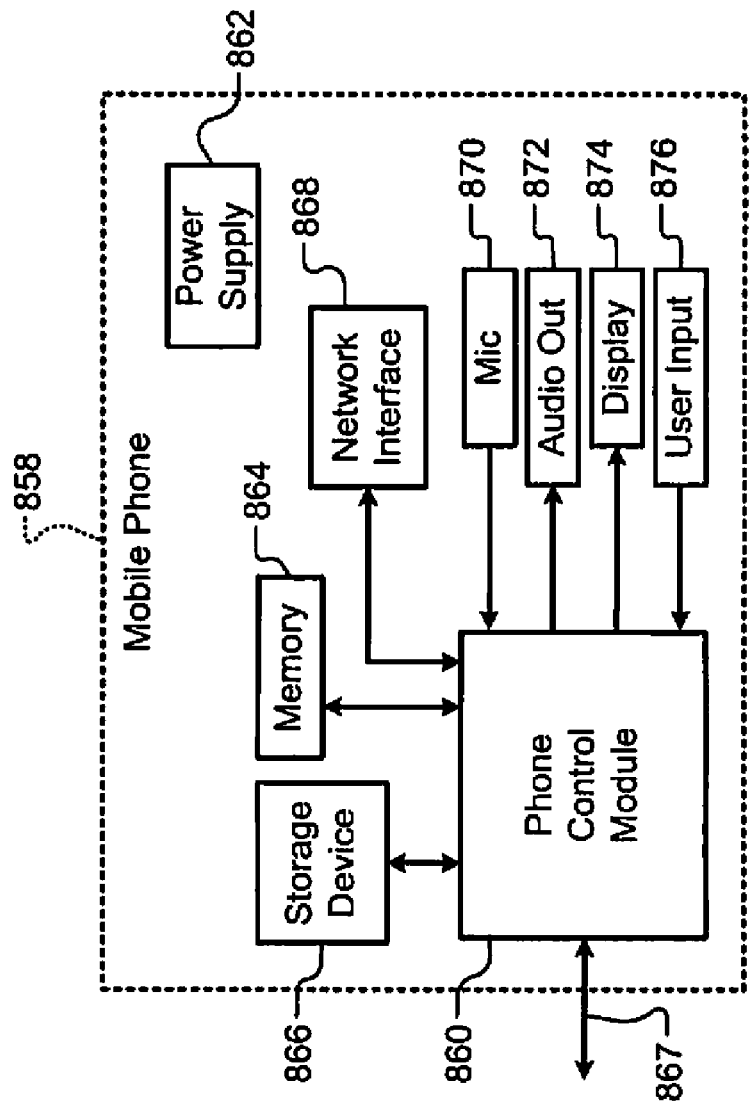
FIG. 11 is a functional block diagram of a mobile phone according to the principles of the present disclosure.

In brief, FIG. 5 is an exemplary functional block diagram of a system of proxy mobility for a multi-interface wireless terminal. FIG. 6 is a functional block diagram of an exemplary home agent that establishes rules for multiple wireless terminal interfaces in a proxy mobility environment. FIG. 7 depicts an exemplary rule structure and exemplary rules for a wireless terminal having two interfaces. FIG. 8 depicts exemplary operation of the home agent. FIG. 9 depicts exemplary operation of a media access gateway in the visited network and FIGS. 10A-10B depict exemplary operation of the media access gateway. FIG. 11 depicts a mobile phone that implements the principles of the present disclosure.

Referring back to FIG. 5, a functional block diagram of an exemplary wireless communications system is presented. A wireless terminal 202 includes a first wireless interface 204 and a second wireless interface 206, which are controlled by a control module 208. The wireless terminal 202 may establish wireless links with first and second visited networks 220-1 and 220-2. The visited networks 220 are able to communicate with a home network 230 of the wireless terminal 202 and may provide proxy mobility to the wireless terminal 202.

The first wireless interface 204 may establish a link with a media access gateway 242 of the visited network 220-1. This link may include, for example, a cellular link, such as a third generation partnership project (3GPP) link or a global system for mobile communications (GSM) link. The 3GPP link may use the universal mobile telecommunications system (UMTS) and/or a long-term evolution (LTE) radio access network (RAN).

The second wireless interface 206 may establish a link with a media access gateway 244 of the visited network 220-2. For example only, this link may include a wireless local area network link (such as Wi-Fi or IEEE 802.11) and/or a wireless metro-area network (such as WiMAX or IEEE 802.16). The media access gateways 242 and 244 communicate with the home agent 246. In various implementations, the media access gateway 242 may accept only a single wireless connection over a single wireless interface type. Alternatively, the media access gateway 242 may accept more than one wireless connection and may support multiple wireless access types.

The media access gateway 242 may provide proxy mobility for the first wireless interface 204 of the wireless terminal 202. The media access gateway 244 may provide proxy mobility for the second wireless interface 206 of the wireless terminal 202. In various implementations, the media access gateways 242 and 244 may both be located within a single visited network, such as the visited network 220-1.

The media access gateway 242 performs authentication, authorization, and accounting (AAA) using an AAA server 250. When the first wireless interface 204 establishes a connection, the media access gateway 242 passes identifying information about the wireless terminal 202 to the AAA server 250. The AAA server 250 returns parameters indicating how to authenticate the wireless terminal 202 as well as the services and networks the wireless terminal 202 is authorized to use. The AAA server 250 also identifies the corresponding home agent, such as the home agent 246.

The media access gateway 242 has address CoA1 (care of address 1), which is routable from the home agent 246. Upon authorizing the wireless terminal 202, the media access gateway 242 transmits a binding update message to the identified home agent 246. The home agent 246 allocates address HoA1 (home address 1) to the wireless terminal 202. The home agent 246 then transmits this address to the media access gateway 242 in a binding acknowledgment message. The media access gateway 242 then assigns HoA1 to the first wireless interface 204. The media access gateway 242 may establish a tunnel to the home agent 246 for packet traffic to and from the first wireless interface 204.

The media access gateway 244 of the visited network 220-2 may function similarly to the media access gateway 242. For purposes of illustration, the media access gateway 244 has an address CoA2, which is also routable from the home agent 246. The media access gateway 244 transmits a binding update to the home agent 246 upon connection of the second wireless interface 206. The binding acknowledgement from the home agent 246 allocates the same address HoA1 to the second wireless interface 206.

Once the first wireless interface 204 establishes a connection, the media access gateway 242 may obtain filtering information. Filtering information allows the home agent 246 to determine what traffic will be sent to the wireless terminal 202 via the first wireless interface 204. The filtering information may be provided by a distributed or centralized repository, such as the AAA server 250. For purposes of illustration only, the AAA server 250 will be described as the source of filter information.

The AAA server 250 may include sets of filters corresponding to specific access types. For example, one set of filters may apply to a WLAN interface. The AAA server 250 may also include filter sets that apply to multiple access types. These filter sets may specify that packets matching a filter within the filter set can be sent across any of the associated interfaces. These filter sets may also include priority information, specifying, for example, that a packet should be directed over a first access type or, if the first access type is not available, over a second access type.

Filters may be created and/or modified based on user subscription information and operator policies of the home network 230 and/or the visited networks 220. The media access gateway 242 may modify or override filter information based on local policies and/or roaming agreements between the visited network 220-1 and the home network 230.

The media access gateway 242 may receive all applicable filter information from the AAA server 250 and then select filter sets associated with the specific access type by which the wireless terminal 204 has connected. Alternatively, the media access gateway 242 may transmit the specific access type to the AAA server 250, which then returns the filters associated with that access type.

The media access gateway 242 may support a single wireless interface type. The media access gateway 242 may then select filter sets corresponding to the same access type each time. However, the filter sets from which to select may vary with each wireless terminal that connects to the media access gateway 242.

In various other implementations, the media access gateway 242 may offer multiple wireless interface types. The media access gateway 242 may then select filter information from the AAA server 250 based upon the type of wireless link the wireless terminal 202 has established with the media access gateway 242.

The selected filter information is transmitted to the home agent 246, and may be included in the binding update message. The media access gateway 242 may also transmit an access type identifier to the home agent 246. The home agent 246 may use the access type identifier when evaluating filter information. As described in more detail below with respect to FIG. 7, the home, agent 246 may not know the mapping between the access type identifier and the actual access type, such as Wi-Fi or cellular, for example.

In various other implementations, the media access gateway 242 may send all received filter information to the home agent 246 along with the access type identifier. The home agent 246 can then select the appropriate filter information based on the access type identifier and any other information known to the home agent 246.

In other implementations, the media access gateway 242 may transmit the access type identifier to the home agent 246. The home agent 246 may then communicate with the AAA server 250 or some other storage system (not shown) to retrieve filter information. The home agent 246 may then select relevant filter sets based upon the access type identifier. In any event, the home agent 246 may replace, modify, and/or supplement filter information, whether received from the media access gateway 242 or from some other source.

Another source of filter information is the wireless terminal 202. The wireless terminal 202 may be pre-programmed with filter information corresponding to each of the first and second wireless interfaces 204 and 206. This filter information may be updated based on the user's service agreement and application requirements.

When the first wireless interface 204 connects to the media access gateway 242, Layer 1 and 2 connections are established. For example, a media access control (MAC) address may be hard-coded into the first wireless interface 204 for use in Layer 2 communication. The first wireless interface 204 may then request a Layer 3 address, such as an IP address, from the media access gateway 242.

Filter information may be sent during negotiation for a Layer 3 address. For example, the first wireless interface 204 may use dynamic host configuration protocol (DHCP) to request an IP address. Filter information may be transmitted within the DHCP request packet and/or the DHCP discover packet. When using IP version 6 (IPv6) stateless address autoconfiguration, the first wireless interface 204 may transmit filter information in a router solicitation request message and/or in a neighbor solicitation message.

The media access gateway 244 may function similarly to the media access gateway 242, and may also provide filter information to the home agent 246. As shown in FIG. 7, the home agent 246 stores filter information corresponding to both the first and second wireless interfaces 204 and 206 when they are both attached to the visited networks 220 or the home network 230.

When two interfaces of a wireless terminal connect to visited networks, the home agent 246 receives a first binding update and then a second binding update from the same wireless terminal. The home agent 246 may normally interpret this as a handoff from one network to another. For example, the wireless terminal 202 may have moved from within range of the visited network 220-1 to within range of the visited network 220-2.

However, in this case, the wireless terminal 202 desires to establish simultaneous connections with the visited networks 220. The home agent 246 should therefore maintain both the first and second link information. The home agent 246 may realize that a binding update represents an additional interface connection when the access type identifier from the two binding updates is different.

Alternatively, the wireless terminal 202 may signal that the additional link should be treated as an additional connection instead of a handoff. This indication of an additional connection can be passed on to the home agent 246 by the media access gateway 244. The home agent 246 is thereby made aware that multiple interfaces of the wireless terminal 202 have established connections, and the first connection should not be removed.

Referring now to FIG. 6, a functional block diagram of an exemplary implementation of the home agent 246, also known as a local mobility agent (LMA), is presented. The home agent 246 includes a network processor 302, which communicates with a network interface 304. In various implementations, additional network interfaces (not shown) may be included in the home agent 246.

Via the network interface 304, the network processor 302 can communicate with the media access gateways 242 and 244 and other network elements within the home network 230 and/or other networks. For example only, the other networks may include core networks (CNs). The network processor 302 receives various packets, including ones that are destined for the wireless terminal 202.

These packets arrive at the home agent 246 with a destination address of HoA1. The network processor 302 references a binding cache module 310 to determine where to forward packets with a destination address of HoA1. The binding cache module 310 may include entries for each wireless terminal associated with the home agent 246, including the wireless terminal 202. Each wireless terminal may be assigned a unique home address.

A home agent module 312 processes binding updates, such as from the media access gateways 242 and 244. The home agent module 312 updates the binding cache module 310 to reflect new wireless terminals and interfaces of those terminals that are being served by the home agent 246. The home agent module 312 may receive filter information from a media access gateway, and this information may be located within the binding update message.

The home agent module 312 provides the filter information to the binding cache module 310. The home agent module 312 also passes any received indication as to whether the additional connection is a hand-off or the connection of an additional interface. For an additional interface, the binding cache module 310 may supplement the binding cache entry for the corresponding wireless terminal instead of replacing the entry.

The home agent module 312 may also transmit binding acknowledgement messages. The binding acknowledgement messages may include allocated home addresses, such as HoA1 for the wireless terminal 202. A tunneling module 314 may establish tunnels between the home agent 246 and the media access gateways 242 and 244 of FIG. 5.

Referring now to FIG. 7, an exemplary binding cache table is displayed. Each binding cache entry may be numbered in column 350. For ease of illustration only, a single binding cache entry is shown in FIG. 7. A binding cache entry may be created for each wireless terminal that is being served by the home agent 246. Column 352 may include the home address of the wireless terminal.

Column 354 may store the address to which packets destined for the packet destination column 352 should be forwarded. Column 354 includes multiple forwarding addresses for HoA1, indicating that the corresponding wireless terminal has multiple interfaces connected. The forwarding addresses, CoA1 and CoA2, correspond to the media access gateway 242 and the media access gateway 244, respectively, of FIG. 5. In various implementations, more than two forwarding addresses may be supported in a single binding cache entry to accommodate wireless terminals with more than two interfaces.

An access type designation may be stored for each of the wireless terminal interfaces in column 356. For example, access types 1 and 2 may map to cellular (such as a cellular implementation of 3GPP) and wireless local area network (WLAN), such as Wi-Fi, respectively. However, it may not be necessary for the home agent 246 to be aware of this mapping. Further access types may be supported, such as access type 3 for a wireless metropolitan area network (such as WiMAX), for example. Other examples of access types include, but are not limited to, wireless personal area network (such as Bluetooth), infrared, microwave, and satellite.

Column 358 may store one or more filter sets for each forwarding address. For example only, a first filter set may correspond to the specific access type, while a second filter set corresponds to any access interface. Each filter set includes filters that have identifying information used to match incoming packets. For example, a filter may match a packet having a specified source address, source port number, destination port number, and/or other header or payload characteristics.

Filters may allow ranges and/or masks to be defined, such as subnet masks. If a packet matches a filter, the packet may be forwarded to the corresponding forwarding address. Alternatively, filters may include a corresponding action, which may include forwarding to the corresponding interface, dropping the packet, and other actions.

For example only, filter set 1 corresponds to access type 1, while filter set 2 corresponds to access type 2. Filter set 3 may correspond to any access type. In other words, filters within filter set 3 may match any incoming packet. Alternatively, filters within filter set 3 may match any packet that would match either filter set 1 or filter set 2.

Overlapping filter sets may be used when fewer than all of the available interfaces of a wireless terminal are connected. For example, if the second wireless terminal interface were not connected, binding cache entry 1 would include only the forwarding address CoA1. Packets that might have matched filter set 2, were it present, may match filter set 3.

For example only, filter set 1 may match voice traffic, filter set 2 may match data traffic, and filter set 3 may match either voice or data traffic. If filter set 3 were not present, and the second wireless interface was not connected (filter set 2 would also be absent), data traffic would not be forwarded. The inclusion of filter set 3, which matches remaining packets, allows data traffic to be transmitted over CoA1 when CoA2 is not available.

Once the second wireless terminal interface is connected, filter set 2 will be added to binding cache entry 1. Then voice traffic can be transmitted over CoA1 while data traffic is transmitted over CoA2. Similarly, when the first wireless terminal interface disassociates from the home agent 246, the home agent 246 may no longer forward packets via CoA1. At this point, voice traffic may be forwarded over CoA2 based on the filter set 3 corresponding to CoA2.

Priority information may be stored to prioritize evaluation of the filter sets. In this way, traffic is routed over the desired interface when both interfaces are connected, while all traffic is routed over the remaining interface when no others are connected. Access type priority may be stored in column 360. The home agent 246 may be configured to evaluate any access-specific filters, such as filter sets 1 and 2, prior to evaluating promiscuous filters, such as filter set 3. A single bit may be stored for each filter set to identify whether the filter set is access-specific or promiscuous. The access-specific filter sets may be evaluated in the order they were added to the binding cache entry, and then the promiscuous filter sets may be evaluated in the order they were added.

Alternatively, as shown in FIG. 7, finer granularity of control may be provided. For example, if a packet matches a filter in filter set 1, the access priority information in column 360 corresponding to filter set 1 indicates that the packet should be sent over access type 1. This means that packets matching filter set 1 will be forwarded to CoA1.

Similarly, packets matching filter set 2 will be forwarded to CoA2. If a packet matches filter set 3, the access priority information in column 350 indicates that the packet should be forwarded over access type 2. If access type 2 is unavailable, access type 1 should be used. Further, if access type 1 is unavailable, access type 3 should be used. Therefore, when access types 1 and 2 are present, a packet matching filter set 3 will be sent to CoA2.

In various implementations, filter set 3 and the access priority information corresponding to filter set 3 may be the same for both forwarding addresses. In such implementations, the home agent 246 may choose to store a single copy of filter set 3 and associated access priority information. When the wireless terminal disassociates from either CoA1 or CoA2, the filter set corresponding to only that wireless terminal interface may be deleted while retaining the common filter set 3. The home agent 246 may accomplish this by evaluating the access priority information in column 360. Filter sets may be deleted when their access priority information indicates that the filter set corresponds only to access types that are no longer present in binding cache entry 1.

Referring now to FIG. 8, a flowchart depicts exemplary operation of the home agent 246 of FIG. 6. Control begins in step 402, where control determines whether a binding update message has been received. If so, control transfers to step 404; otherwise, control transfers to step 406. In step 404, filter information from the binding update is added to the binding cache. For example, a set of filters corresponding to the link established between a wireless terminal and the media access gateway may be added to a table entry corresponding to that wireless terminal.

Control continues in step 408, where control sends a binding acknowledgement message to the media access gateway. The binding acknowledgement message includes a home address that control has allocated for the wireless terminal. Control continues in step 410, where control sets up a tunnel to the source of the binding update, such as a media access gateway.

Control continues in step 412, where control determines whether an additional interface flag was set in the binding update message. The additional interface flag is set when the wireless terminal is establishing a wireless link using another wireless interface. The additional interface flag will be cleared when the wireless terminal is disconnecting from one media access gateway and connecting to another media access gateway. If the additional interface flag is set, control transfers to step 406; otherwise, control transfers to step 414.

In step 414, because this binding update is a result of a handoff, some or all of the previous filter information is removed from the binding cache. For example, the filter entries corresponding only to the previous wireless connection may be deleted from the binding cache entry for the wireless terminal. Control then continues in step 406.

In step 406, control determines whether a packet has been received from the media access gateway. If so, control transfers to step 416; otherwise, control transfers to step 418. In step 416, the packet is decapsulated and forwarded to its destination. Control then continues in step 418.

In step 418, control determines whether a packet has been received from a source other than the media access gateway. If so, control transfers to step 420; otherwise, control returns to step 402. In step 420, control determines whether the packet matches any entry in the binding cache. First, control may identify a binding cache entry having the home address indicated by the destination of the packet.

The filter sets for that binding cache entry may then be evaluated against the packet. If the packet matches a filter, the filter may specify an action to be performed on the packet. There may also be default actions for filter matches. Control continues in step 422, where control determines whether the identified action includes forwarding. If so, control transfers to step 424; otherwise, control transfers to step 426. For example, other actions may include replicating the packet, storing the packet, and/or dropping the packet.

In step 424, the packet is encapsulated and sent to the appropriate media access gateway as indicated by the binding cache. Control then continues in step 426, where any other actions specified by the binding cache are performed. Control then returns to step 402.

Referring now to FIG. 9, a functional block diagram of an exemplary implementation of the media access gateway 242 is presented. The media access gateway 244 may be implemented similarly. The media access gateway 242 includes a network processor 500 that communicates with other network devices, such as the home agent 246, via a network interface 502. A wireless interface 504 interfaces with wireless terminals. In various implementations, the wireless interface 504 may support a single access type, such as Wi-Fi.

The media access gateway 242 includes a proxy mobility agent (PMA) module 506 that communicates with the network processor 500. The PMA module 506 receives access requests from wireless terminals and generates binding update messages based on these access requests. The binding updates are sent to a corresponding home agent, which may be selected based upon AAA information. The PMA module 506 processes received binding acknowledgements and provides assigned addresses to wireless terminals.

An authorization module 508 may interact with an AAA server. The authorization module 508 may determine whether a wireless terminal requesting access is authorized to connect to the media access gateway 242. The authorization module 508 may also receive identifying home agent information and filter information from the AAA server. Alternatively, the PMA module 506 may receive filter information from the wireless terminal.

Once the PMA module 506 has received a binding acknowledgement, the PMA module 506 may establish a tunnel with the corresponding home agent using a tunneling module 510. The tunneling module 510 may encapsulate packets for transmission to the home agent and may decapsulate packets received from the home agent.

A filter information module 512 may analyze filter information obtained from the AAA server and/or from the wireless terminal. The access type by which the wireless terminal is accessing the media access gateway 242 may be used to select appropriate filter sets. The filter information module 512 may modify and/or replace filter information based upon information from the authorization module 508 and/or local settings of the media access gateway 242. The filter information module 512 provides tailored filter information to the PMA module 506, which transmits this tailored filter information to the corresponding home agent. This filter information may be included in the binding update message sent to the home agent.

Referring now to FIG. 10A, a flowchart depicts exemplary steps performed by the media access gateway 242 of FIG. 9. Control begins in step 602, where control determines whether an access request has been received. If so, control transfers to step 604; otherwise, control transfers to step 606. In step 604, control performs authentication and authorization, which may involve a query to an AAA server. If the wireless terminal is authorized, control transfers to step 608; otherwise, control transfers to step 606.

In step 608, control retrieves filter information from the AAA server based on the access type. The filter information may already have been provided as part or the authentication and authorization of step 604. The AAA server may provide all available filter sets for the wireless terminal, from which filter sets are selected based on the access type for the media access gateway 242.

Control continues in step 610, where control determines whether the wireless terminal has indicated that this is an additional connection. If so, control transfers to step 612; otherwise, control transfers to step 614. An additional connection is present when an additional interface of the wireless terminal connects to a network, instead of an interface switching from one network to another.

In step 612, control transmits a binding update to the home agent identified by the AAA information. The binding update may include the selected filter information as well as the additional interface flag. The additional interface flag indicates that the home agent should add the present interface to the binding cache entry, instead of replacing the binding cache entry, as would occur with a handoff. Control continues in step 606.

In step 614, control transmits a binding update to the selected home agent. The binding update includes the selected filter information, and control continues in step 606. In step 606, control determines whether a binding acknowledgement has been received. If so, control transfers to step 616; otherwise, control transfers to step 618. In step 616, control sets up a tunnel to the corresponding home agent and control continues in step 620. In step 620, control assigns the IP address received in the binding acknowledgement to the wireless terminal. Control continues in step 618.

In step 618, control determines whether a packet has been received from the wireless terminal. If so, control transfers to step 622; otherwise, control transfers to step 624. In step 622, control encapsulates the packet, sends the packets to the home agent, and continues in step 624. In step 624, control determines whether a packet has been received from the home agent. If so, control transfers to step 626; otherwise, control returns to step 602. In step 626, control decapsulates the packet and sends the decapsulated packet to the wireless terminal. Control then returns to step 602.

Referring now to FIG. 10B, a flowchart depicts alternative exemplary operation of the media access gateway 242. Control may be similar to that of FIG. 10A. Control begins in step 702, where control determines whether an access request is received from a wireless terminal. If so, control transfers to step 704; otherwise, control transfers to step 606.

In step 704, filter information is received from the wireless terminal. In various implementations, the filter information may be received as part of the access request. Control then continues in step 604. Step 612 of FIG. 10A is replaced with step 706. In step 706, instead of retrieving filter information from the AAA server, control analyzes the filter information received from the wireless terminal. Control may replace, prune, and/or modify this information. Control then continues in step 610.

Referring now to FIG. 11, the teachings of the disclosure can be implemented in the teachings of the disclosure can be implemented in a phone control module 860 of a mobile phone 858. The mobile phone 858 includes the phone control module 860, a power supply 862, memory 864, a storage device 866, and the cellular network interface 867. The mobile phone 858 may include a network interface 868, a microphone 870, an audio output 872 such as a speaker and/or output jack, a display 874, and a user input device 876 such as a keypad and/or pointing device. If the network interface 868 includes a wireless local area network interface, an antenna (not shown) may be included.

The phone control module 860 may receive input signals from the cellular network interface 867, the network interface 868, the microphone 870, and/or the user input device 876. The phone control module 860 may process signals, including encoding, decoding, filtering, and/or formatting, and generate output signals. The output signals may be communicated to one or more of memory 864, the storage device 866, the cellular network interface 867, the network interface 868, and the audio output 872.

Memory 864 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 866 may include an optical storage drive, such as a DVD drive, and/or a hard disk drive (HDD). The power supply 862 provides power to the components of the mobile phone 858. The teachings of the disclosure can be implemented similarly in other devices such as a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A media access gateway comprising:
   a wireless network interface that selectively establishes a wireless link with a first interface of a wireless terminal that has a plurality of wireless interfaces;
   an authorization module that determines a home agent corresponding to the wireless terminal;
   a filter information module that receives filter information from one of the wireless terminal and a server and generates output filter information; and
   a proxy mobility agent module that transmits a binding update to the home agent, wherein the binding update includes the output filter information.

2. The media access gateway of claim 1 wherein the wireless link is a first type and the binding update includes an identifier of the first type.

3. The media access gateway of claim 2 wherein the first type is one of cellular, wireless local area network, wireless metropolitan area network, and wireless personal area network.

4. The media access gateway of claim 1 wherein the wireless link is a first type, and wherein the filter information module receives the filter information from the server and generates the output filter information by removing filter information that is not associated with the first type.

5. The media access gateway of claim 1 wherein the wireless link is a first type, and wherein the filter information module transmits an identifier of the first type to the server, receives the filter information from the server, and outputs the filter information as the output filter information.

6. The media access gateway of claim 1 wherein the proxy mobility agent module receives an additional interface flag from the wireless terminal and wherein the binding update includes the additional interface flag.

7. The media access gateway of claim 6 wherein the home agent maintains previous state information for the wireless terminal when the binding update includes the additional interface flag.

8. The media access gateway of claim 1 wherein the authorization module determines the home agent by querying the server and determines the home agent by querying the server.

9. A communications system comprising:
   the media access gateway of claim 1; and
   the home agent, which comprises:
      a home agent module that receives the binding update;
      a binding cache module that stores an entry corresponding to the wireless terminal, wherein the entry includes the output filter information; and
      a network processor that selectively forwards packets based on the output filter information.

10. The communications system of claim 9 wherein the home agent module selectively receives an additional interface flag, wherein the binding cache module selectively replaces a previous entry in the binding cache when the additional interface flag is in a first state, and wherein the binding cache module supplements a previous entry in the binding cache when the additional interface flag is in a second state.

11. The communications system of claim 9 wherein the home agent module allocates a home internet protocol (IP) address to the wireless terminal when the binding cache module first creates the entry for the wireless terminal.

12. The communications system of claim 11 wherein the network processor evaluates the output filter information for packets having a destination address of the home IP address.

13. The communications system of claim 12 wherein the network processor selectively forwards packets that match the output filter information to the media access gateway.

14. The communications system of claim 9 further comprising the wireless terminal, the wireless terminal comprising:
   a plurality of wireless interfaces, wherein the plurality of wireless interfaces selectively establish wireless links with a plurality of media access gateways including the media access gateway; and
   a control module that controls the plurality of wireless interfaces.

15. The communications system of claim 14 wherein the control module stores filter information for each of the plurality of wireless interfaces.

16. The communications system of claim 15 wherein when one of the plurality of wireless interfaces establishes a wireless link with one of the plurality of media access gateways, the control module transmits filter information for the one of the plurality of wireless interfaces to the one of the plurality of media access gateways.

17. The communications system of claim 16 wherein the filter information is included in a message that requests a Layer 3 address from the one of the plurality of media access gateways.

18. The communications system of claim 14 wherein the control module transmits an additional connection flag having a first state when one of the plurality of wireless interfaces replaces one wireless link with another wireless link and wherein the control module transmits the additional connection flag having a second state when the one of the plurality of wireless interfaces establishes a new wireless link.

19. A method comprising:
   selectively establishing a wireless link with a first interface of a wireless terminal that has a plurality of wireless interfaces;
   determining a home agent corresponding to the wireless terminal;
   receiving filter information from one of the wireless terminal and a server;
   generating output filter information based on the filter information;
   transmitting a binding update to the home agent, wherein the binding update includes the output filter information;
   receiving the binding update;
   storing an entry corresponding to the wireless terminal in a binding cache, wherein the entry includes the output filter information;
   selectively forwarding packets based on the output filter information;
   selectively establishing wireless links between the plurality of wireless interfaces of the wireless terminal and a plurality of media access gateways;
   storing filter information for each of the plurality of wireless interfaces; and
   transmitting filter information for one of the plurality of wireless interfaces to one of the plurality of media access gateways when the one of the plurality of interfaces establishes a wireless link with the one of the plurality of media access gateways,
   wherein the filter information is transmitted in a message that requests a Layer 3 address from the one of the plurality of media access gateways.

* * * * *